Dec. 31, 1935.  R. L. BROWN ET AL  2,026,341
WATER HEATER
Filed June 29, 1933  2 Sheets-Sheet 1
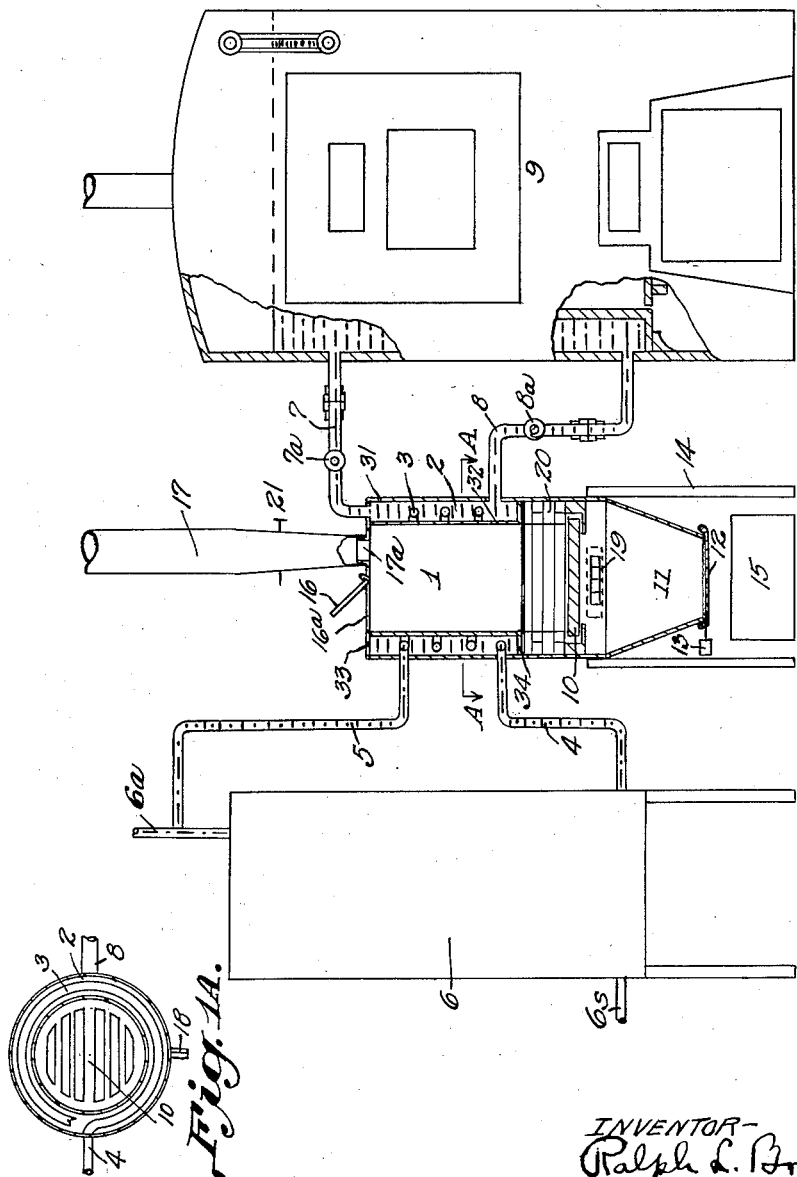

Dec. 31, 1935.    R. L. BROWN ET AL    2,026,341
WATER HEATER
Filed June 29, 1933    2 Sheets-Sheet 2
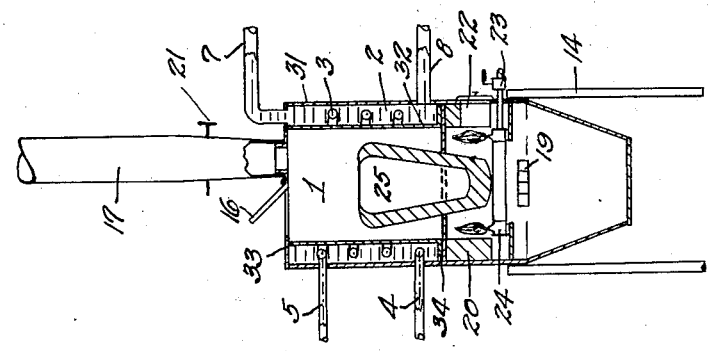
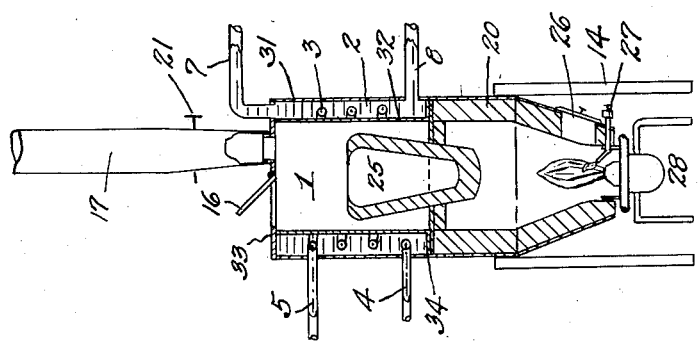

Patented Dec. 31, 1935

2,026,341

UNITED STATES PATENT OFFICE 2,026,341

WATER HEATER

Ralph L. Brown, Montclair, and Norman W. Wroby, Maplewood, N. J., assignors to George R. Spangenberger, Newark, N. J.

Application June 29, 1933, Serial No. 678,286

2 Claims. (Cl. 122—32)

The invention relates to what may be referred to as a dual type of water heater or in other words a water heater of the conversion type.

The invention contemplates the employment with a furnace fired main heater in which a main body of liquid is relied upon for certain purposes as for heating either directly or indirectly rooms of a building, of a furnace fired auxiliary heater having an auxiliary body of water therein that is in circulating communication with the main body of liquid in the main heater and a storage tank having connected thereto a water circulating means providing a coil or the like which is within the auxiliary body of water of the auxiliary heater.

One object of the invention is to provide a furnace fired auxiliary or secondary heater and to use the same in conjunction with a furnace fired main heater wherein a body of water is relied upon for the supplying of heat either directly or indirectly to the rooms of a compartment or building in such a manner that in cold weather the furnace of the main heater may be fired for heating the main body of water—either with or without a firing being carried out in the furnace of the auxiliary heater according to the mode of operation desired—but in which during mild weather a firing can be carried out in the auxiliary heater without a firing being carried out in the main heater whereby through the heating of the auxiliary body of water in the auxiliary heater and as the result of water circulating between the auxiliary heater and the main heater there can be effected a desired heating but generally only up to a relatively low temperature of the water within the main heater.

Another object of the invention is to provide within the furnace fired auxiliary heater a circulating piping arrangement that is connected to a supply tank and which has a heat interchanging coil that is located within the body of water of the auxiliary heater whereby there can take place an interchange of heat from the body of water of the auxiliary heater to and into the water within the circulating pipe whereby the water in the supply tank can ultimately become and will be maintained heated. There is a cold water supply pipe by which water is passed to the storage or supply tank as hot water is withdrawn from the storage tank through a discharge pipe leading from the storage tank.

Another object of the invention is to provide the conduits or pipes that afford communication as between the auxiliary and main heater with suitable valve means whereby the functioning of either heater can be carried out independent of the other when the valve means is closed but which when open permits a circulating of water whereby the heating of water in both heaters can be effected by a firing carried out in the furnace of either of the heaters.

Another object of the invention is to provide a certain type of furnace fired auxiliary heater which readily adapts itself for use in conjunction with a heat storage tank and which can be readily connected into an existing house heater.

Another object of the invention is to construct an auxiliary heater which will be simple, which will be effective and which will adapt itself to any one of several types of firing as by firing methods employing solid, liquid or gaseous fuel according to the desires of a particular purchaser.

From what has preceded and from that which is clearly set forth and described herein it will be noted that the auxiliary heater is employed in what may be termed a house heating and water supply heating system.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

As showing certain specific manners in which the invention may be realized reference is made to the drawings forming a part of this specification in which Figure 1 is a view of a system illustrating a manner in which a furnace fired house heater or the like, a furnace fired auxiliary heater, and a hot water storage tank are operatively connected. In this figure certain portions thereof are shown either broken away or in section, as will be manifest from an inspection of the drawings.

Fig. 1A is a sectional view taken as on the plane indicated by the line A—A of Fig. 1.

Fig. 2 is a view partially in section of an auxiliary heater wherein a gas firing is carried out.

Fig. 3 is a view partially in section showing an auxiliary heater wherein oil firing is employed.

Referrence will now be made to the drawings in detail.

The auxiliary water heater about which the invention revolves is designated by 1 and it is herein frequently referred to as the furnace fired auxiliary heater. It is shown in Figs. 1, 2 and 3 as having a water receiving space 2 within which there is located the coils 3 constituting part of a water circulating heat interchange system that comprises the pipes 4 and 5 which are in turn connected to a water storage tank 6. In short, it will be noted that when water is heated within the pipes 3 a circulation takes place by water flowing from the tank 6 upwardly through the pipe 4 into the lower end of the pipe coil 3 thence from the upper end of the pipe coil by way of pipe 5 leading to the interior of the storage tank 6.

The water space 2 of the auxiliary heater is connected by means of the pipes 7 and 8 to the water receiving space of the furnace fired main heater 9, as will be manifest from an inspection of Fig. 1. This heater 9 may be of any type suitable for heating houses, compartments or the like and has any suitable opening by which the heating medium leaves the heater for passage to remotely spaced rooms, compartments or the like but as is usual with heaters of this type it depends for its functioning upon a main body of water maintained within the heater and in the ordinary functioning of this heater this main body of water is maintained hot by suitable firing carried out in the furnace thereof. The pipes 7 and 8—referred to—may be provided with suitable valve means for closing off the communication between the main heater and the auxiliary heater. The valve means just referred to may be provided by a valve 8ª in the pipe 8 and valve 7ª in the pipe 7, either or both of which valves may be closed when the line of communication is desired to be shut off.

An inspection of the figures will make it clear that the auxiliary heater comprises an outer cylindrical shell 31, an inner cylindrical shell 32, an upper head 33 and a lower head 34 which heads 33 and 34 extend from the inner to the outer shells whereby there is provided the water receiving space 2 which is sometimes referred to as the auxiliary heater receiving space. This water receiving space may be defined as being located between the heads 33 and 34 and in the space between the outer and inner shells 31 and 32.

It will also be noted that the coils of the pipe coil 3 encircle the inner shell 32 and occupy a spaced relation in respect to each of the shells with the result that each pipe coil is completely surrounded by the water in the auxiliary body of water 2 thus facilitating a ready exchange of heat from the auxiliary body of water 2 to the water within the pipe coils 3. The outer shell 31 depends a substantial distance below the lower head 34 and at the lower end of this outer shell 31 there is an inwardly and downwardly tapering section 11 providing an opening which in Fig. 1 is normally closed by the pivoted door 12 which is normally held in closed position due to the counterweight at 13. This outer shell has secured thereto legs or standards 14 whereby the lower end of the shell is supported in spaced relationship above a floor thus permitting the entrance and withdrawal of a receiving member 15 into which ashes may be dumped by opening the door 12. This shell member carries in any suitable manner grates 10 upon which solid fuel is supported when a firing or burning of the same is taking place. The section of the shell immediately above the grate and below the lower head 34 is provided with suitable refractory material indicated at 20 thus completing a refractory lined fire box whereby the auxiliary heater is provided with a suitable furnace. The interior portion of the inner shell may be considered as constituting a continuation of the fire box or combustion chamber of the furnace. It also provides a passageway through which products of combustion flow upwardly towards an exit or offtake opening 17ª leading to the stack 17.

A suitable damper controlled opening is provided at 19 below the grate whereby the firing effect within the auxiliary heater is regulated and the stack 17 may also be provided with a damper indicated as at 21 for regulating the firing effect. Access to the interior of the combustion space is provided by an opening at 16ª normally closed by a cover plate 16 which is in the roof section of the auxiliary heater and where a solid fuel firing is employed this opening 16ª constitutes the opening through which the fuel is supplied.

In the arrangement of Fig. 2 gas firing is employed. There is provided an opening at 22 by which the gas can be lighted and a refractory cone may be employed as at 25 for absorbing and giving off heat thus facilitating the heat transfer from the gas flame to the water in the auxiliary storage space. Otherwise the auxiliary heater 25 of Fig. 2 is the same as the auxiliary heater of Fig. 1.

In Fig. 3 there is diagrammatically illustrated an oil burner at 28, a door is provided at 26 whereby access to or inspection of the burner is readily accomplished. A pilot is provided at 27 and of course this oil burner may be one which may be automatically or otherwise regulated. The entire depending portion of the outer shell is refractorily lined so as to give a relatively large combustion space and a refractory cone 25 is provided for absorbing and giving off heat in the manner incident to such members. The auxiliary heater of Fig. 3 is substantially the same except for its mode of firing as the auxiliary heater of Fig. 1.

If the weather is cold fire will be maintained in the furnace of the furnace fired main heater and it may be that it will be further advisable to also maintain a fire in the auxiliary heater. This is largely dependent upon weather conditions but in any event under cold weather conditions it will undoubtedly be advisable to operate the main heater. However, there are times when no heat is desired in the main heater or only a small amount of heat is desired in the main heater although hot water is desired from the auxiliary heater. Under such conditions no fire is maintained in the main heater but suitable firing is carried out in the auxiliary heater. If some heat is desired from the main heater this can be realized by allowing the auxiliary body of water at 2 to circulated through the means of the open pipes 7 and 8 with the body of water in the main heater thus bringing the temperature of the water in the main heater up to the desired point. If no heat is desired in the main heater the valves 7ª and 8ª or either of them can be closed to shut off this circulation of water as between the auxiliary and main heaters. The pipe coil 3 being located in the auxiliary body of water 2 will absorb heat therefrom according to the temperature of the auxiliary body of water and a circulation will ensue whereby the water in the tank 6 will be indirectly heated as the result of heat absorbed from the auxiliary body of water 2 and the water stored in tank 6 will ultimately become heated and will be maintained heated to a temperature dependent upon the temperature conditions within the auxiliary heater.

This tank 6 is supplied with water as drawn through the cold water supply 6s. The hot water from the tank 6 is withdrawn through the pipe 6d.

What is claimed is:—

1. In a water heating system, in combination; walls forming an annular chamber adapted to be filled with water and having an inlet and an outlet arranged for water circulation; a hollow body positioned within and substantially surrounding the inner wall of said annular chamber and provided with an inlet and an outlet arranged for convection water circulation, a container adapted to hold a body of water and being connected to the inlet and outlet of said chamber, means for heating the body of water in said container, and means for heating the walls of said annular chamber, whereby the water circulating in said hollow body may be heated either by heating the water in said container or by applying heat directly to the walls of said annular chamber.

2. In a water heater system, in combination, walls forming an annular chamber adapted to be filled with water and having an inlet and an outlet arranged for water circulation; a hollow body positioned within said annular chamber and provided with an inlet and an outlet arranged for convection water circulation, a container adapted to hold a body of water and being connected to the inlet and outlet of said chamber, means for heating the body of water in said container and means for heating the walls of said annular chamber, whereby the water circulating in said hollow body may be heated either by interchanging heat between the water filling said annular chamber and the body of water in the container or by interchanging heat between the walls of said inner chamber and the said body of water therein.

RALPH L. BROWN.
NORMAN W. WROBY.